(12) United States Patent
Liao et al.

(10) Patent No.: US 9,303,372 B2
(45) Date of Patent: Apr. 5, 2016

(54) SYCHRONOUS CONTROL INTEGRATED SYSTEM FOR BRIDGE LIFTING

(71) Applicants: China Engineering Consultants, Inc., Taipei (TW); Cheng-Shiu University, Kaohsiung (TW)

(72) Inventors: Ching-Lung Liao, Taipei (TW); Min Chao, Kaohsiung (TW); Chung-Yue Wang, NewTaipei (TW); Jin-Chung Ma, NewTaipei (TW); Wu-Peng Peng, Taipei (TW)

(73) Assignees: CHINA ENGINEERING CONSULTANTS, INC., Kaohsiung (TW); CHENG SHIU UNIVERSITY, Kaohsiung (TW)

( * ) Notice: Subject to any disclaimer, the term of this patent is extended or adjusted under 35 U.S.C. 154(b) by 0 days.

(21) Appl. No.: 14/247,668

(22) Filed: Apr. 8, 2014

(65) Prior Publication Data
US 2014/0309767 A1    Oct. 16, 2014

(30) Foreign Application Priority Data
Apr. 10, 2013   (TW) .............. 102112784 A

(51) Int. Cl.
| G05B 11/01 | (2006.01) |
| E01D 22/00 | (2006.01) |
| E01D 15/00 | (2006.01) |
| E01D 15/02 | (2006.01) |
| G05B 11/60 | (2006.01) |

(52) U.S. Cl.
CPC ............... E01D 22/00 (2013.01); E01D 15/00 (2013.01); *E01D 15/02* (2013.01); *G05B 11/60* (2013.01)

(58) Field of Classification Search
CPC ........ E01D 22/00; E01D 15/02; G05B 11/01; G05B 11/60
USPC ............. 700/213, 275, 279, 282, 302, 13, 60; 254/89 R, 89 H; 14/42, 58, 59
See application file for complete search history.

(56) References Cited

U.S. PATENT DOCUMENTS

| 3,466,686 A * | 9/1969 | Allen ............................ 14/42 |
| 2010/0001874 A1 * | 1/2010 | Cipra ....................... G01N 3/34 340/683 |

* cited by examiner

*Primary Examiner* — Mark Beauchaine
(74) *Attorney, Agent, or Firm* — Jackson IPG PLLC; Demian K. Jackson

(57) ABSTRACT

A synchronous control integrated system for bridge lifting, comprising a monitor mechanism; an oil pressure control mechanism, connected to the monitor mechanism; a plurality of jacks, each connected to the oil pressure mechanism, respectively; and a sensor mechanism, connected to the monitor mechanism. As such, a shift variance generated by girders of a bridge may form a signal by using a sensor mechanism and jacks together transmitted on line to a monitor mechanism as a control parameter, so that the monitor mechanism may have an accurate adjustment and monitoring on an oil pressure control mechanism and the jacks, whereby completing the synchronous control operation for the bridge lifting course. Furthermore, the bridge lifting construction may have its improved accuracy and safety.

3 Claims, 2 Drawing Sheets

SYCHRONOUS CONTROL INTEGRATED SYSTEM FOR BRIDGE LIFTING

FIELD OF THE INVENTION

Figure 1:
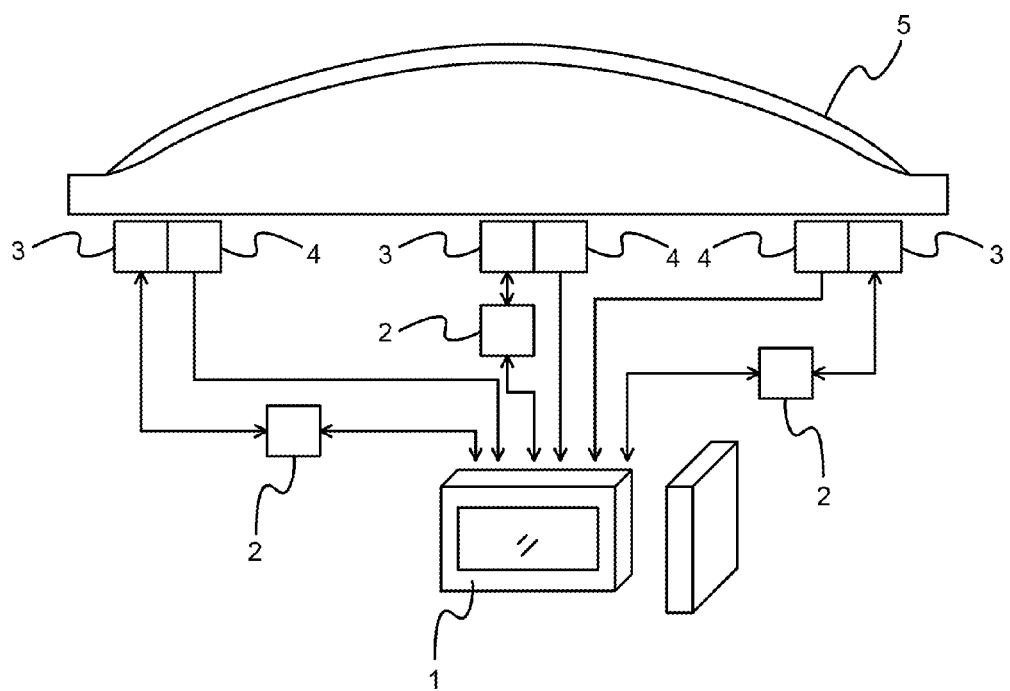

The present invention relates to a synchronous control integrated system for bridge lifting, and particularly to a synchronous control integrated system for bridge lifting where a shift variance generated by girders of a bridge may form a signal by using a sensor mechanism and jacks together transmitted on line to a monitor mechanism as a control parameter, so that the monitor mechanism may have an accurate adjustment and monitoring on an oil pressure control mechanism and the jacks, whereby completing the synchronous control operation for the bridge lifting course. Furthermore, the bridge lifting construction may have its improved accuracy and safety.

DESCRIPTION OF THE RELATED ART

At present, the bridge lifting construction method is generally implemented by screwing a supporting bracket at an outer side of an abutment or pier cap concrete structure body, whereby an operational platform for setting up a jack. Furthermore, girders of the bridge are each used as a pivot for lifting jacks.

However, since the construction equipment or lifting speed in the bridge lifting course has its difference, the girders of the bridge may have variant position shift, resulting in an additional strain in the bridge body. Further, the structural force state associated with the bridge body might have a variance due to the weight shift of the upper structure distributed on the jacks under the bridge body in the course of bridge lifting, where each of the jacks may have a weight load from tens of tons to hundreds of tons, and the aging problem and the environment associated with the bridge body. Furthermore, the structure of the bridge structure may have an impair, a breakage and even a violation. At this time, the variant position shift may accumulate errors owing to the increased altitude of the raised bridge, and thus increase the inclination of the bridge body. This may not only lead to an impair to the bridge body structure, but the construction safety may be adversely affected at its worst case.

With the consideration of the repair cost, the required time, and the caused inconvenience of traffic, the total damage may be inestimable.

In view of this, the drawbacks mentioned above, the inventor of the present invention provides a synchronous control integrated system for bridge lifting, after many efforts and researches to overcome the shortcoming encountered in the prior art.

SUMMARY OF THE INVENTION

It is, therefore, an object of the present invention to provide a synchronous control integrated system for bridge lifting, in which a shift variance generated by girders of a bridge may form a signal by using a sensor mechanism and jacks together transmitted on line to a monitor mechanism as a control parameter, so that the monitor mechanism may have an accurate adjustment and monitoring on an oil pressure control mechanism and the jacks, whereby completing the synchronous control operation for the bridge lifting course. Furthermore, the bridge lifting construction may have its improved accuracy and safety.

To achieve the above object, the synchronous control integrated system for lifting the bridge according to the present invention comprises a monitor mechanism; an oil pressure control mechanism, connected to the monitor mechanism; a plurality of jacks, each connected to the oil pressure mechanism, respectively; and a sensor mechanism, connected to the monitor mechanism.

In an embodiment, the synchronous control integrated system for lifting the bridge as claimed in claim 1, wherein the monitor mechanism comprises a lifting policy module and a lifting monitor module for receiving a sensor signal generated from the sensor mechanism.

In an embodiment, the lifting policy module comprises a pre-lifting construction unit, a test-lifting construction unit, a lifting construction unit, a pressure maintenance construction unit, and a bridge lowering construction unit.

In an embodiment, the sensor mechanism comprises a position variance sensor, an inclination sensor, a strain sensor, and a pressure sensor.

BRIEF DESCRIPTIONS OF THE DRAWINGS

Figure 2:
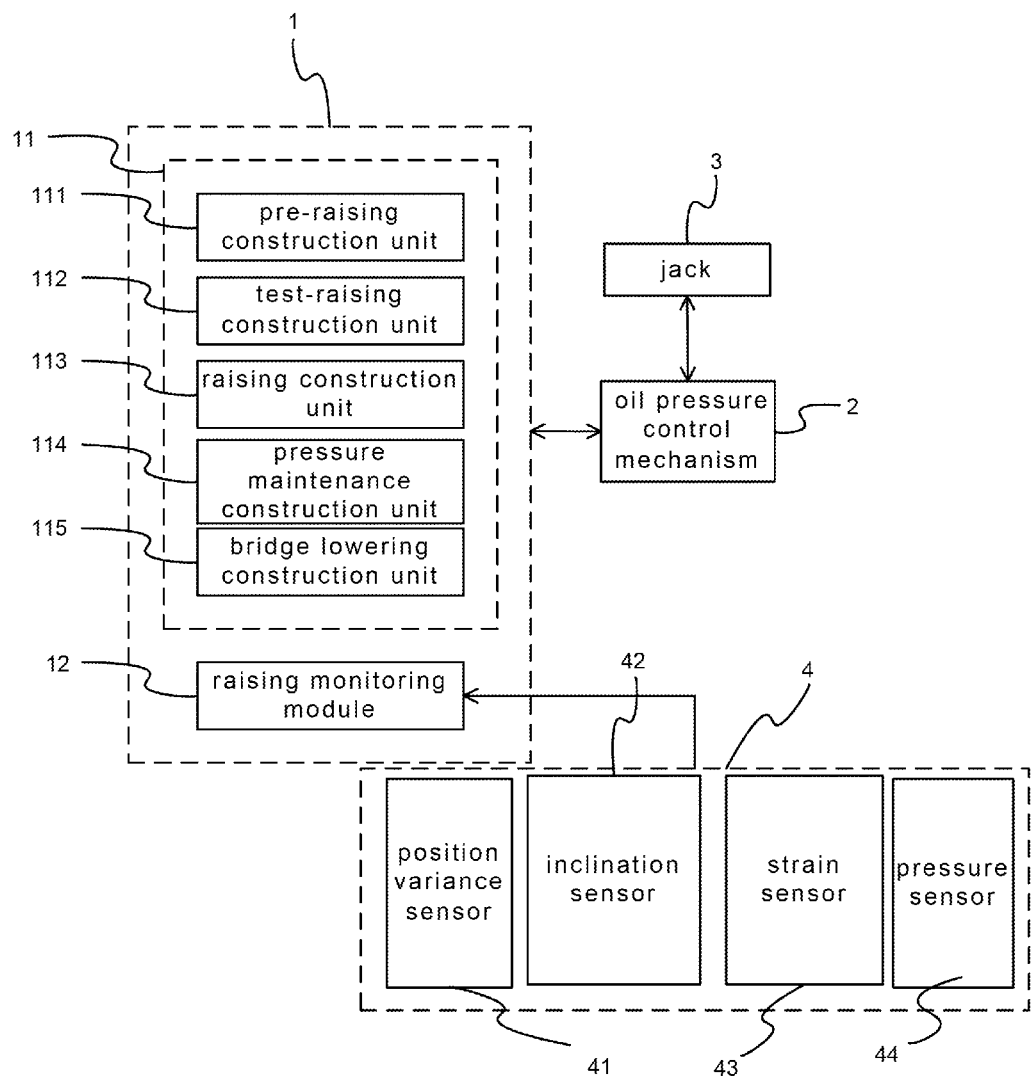

The present invention will be better understood from the following detailed descriptions of the preferred embodiments according to the present invention, taken in conjunction with the accompanying drawings, in which:

FIG. 1 is a schematic diagram of a basic architecture according to the present invention; and FIG. 2 is a schematic block diagram according to the present invention.

DESCRIPTION OF THE PREFERRED EMBODIMENTS

Referring to FIG. 1 and FIG. 2, a schematic diagram of a basic architecture according to the present invention; and a schematic block diagram according to the present invention are shown, respectively. As shown, a synchronous control integrated system for lifting a bridge comprises a monitor mechanism 1, an oil pressure control mechanism 2, a plurality of jacks 3, and a sensor mechanism 4.

The oil pressure control mechanism 2 is connected to the monitor mechanism 1. The plurality of jacks 3 are each connected to the oil pressure mechanism, respectively. The sensor mechanism 4 is connected to the monitor mechanism 1.

In the above, the monitor mechanism 1 comprises a lifting policy module 11 and a lifting monitor module 12. The lifting policy module 11 comprises a pre-lifting construction unit 111, a test-lifting construction unit 112, a lifting construction unit 113, a pressure maintenance construction unit 114, and a bridge lowering construction unit 115.

The sensor mechanism 4 is connected to the monitor mechanism 1 and the lifting monitoring module 12 receives a sensor signal generated from the sensor mechanism 4. The sensor mechanism 4 comprises a position variance sensor 41, an inclination sensor 42, a strain sensor 43, and a pressure sensor 44.

When the present invention is operated, each of the jacks 3 and the position variance sensor 41, the inclination sensor 42, and the strain sensor 43 of the sensor mechanism 4 are disposed at some proper places of the bridge 5, respectively, such as a place between girders and piers at the upper structure of the bridge. The pressure sensor 44 is connected to the jacks, for construction of bridge lifting.

In operation, the position variance sensor 41, inclination sensor 42, strain sensor 43 and pressure sensor 44 of the sensor mechanism 4 are used together with the jacks 3, a shift variance generated by girders of the bridge 5 is transmitted on line to the monitor mechanism 1 as a control parameter, so that the monitor mechanism 1 may monitor some signals, such as a bridge lifting sense shift signal, a strain signal, and a jack weight-load signal, by the lifting policy module 11 and the lifting monitoring module 12. As such, a feedback and alarm function may be provided to enable the monitor mechanism 1 to accurately adjust and control the oil pressure control mechanism 2 and the jacks 3, thereby achieving in a synchronous control in the course of the lifting the bridge 5, and thus reducing a safety issue of the bridge owing to a variance deformity of the bridge body in the lifting course.

However, the safety monitoring parameters comprise on line detections in the course of lifting, such as two axial inclinations along a bridge length and a bridge width directions, a position shift and a strain of the upper structure of the bridge 5, and weight load detection of the jacks 3. Further, the monitor mechanism 1 uses concurrently the pre-lifting construction unit 111, the test-lifting construction unit 112, the lifting construction unit 113, the pressure maintenance construction unit 114, and the bridge lowering construction unit 115 of the lifting policy module 11 as the lifting construction policy synchronously as the jacks 3 are adjusted and controlled in the course of lifting. Further, the lifting monitoring module 12, the position variance sensor 41, the inclination sensor 42, the strain sensor 43 and the pressure sensor 44 are also used together to monitor the bridge lifting, so as to assure the safety of the synchronous lifting. As such, any overly large shift in the course of lifting may be on line found, or any strain on some main forcing portion of the bridge 5 may be monitored, to determine on line an extent the additional strain affects on the structure, or thus monitor the weight load of the jacks. The monitored results may be further used as a control index for bridge 5 lifting construction, thereby increasing the safety of the overall construction. Furthermore, the lifting policy has to be finely tuned in the course of bridge lifting to avoid accumulated position shift variance.

In the lifting policy module 11, the operations of the pre-lifting construction unit 111, the test-lifting construction unit 112, the lifting construction unit 113, the pressure maintenance construction unit 114, and the bridge lowering construction unit 115 are described as follows, respectively.

The pre-lifting construction unit 111 is used for pre-raise the jacks 3, and used to assure there is no any oil leakage and loosened matter for a high pressure soft tubing between the jacks 3 and the oil pressure control mechanism 2, there is no exceptional deformity occurring on the lifting basis, and the connection among the monitor mechanism 1, the oil pressure control mechanism 2, the jacks 3, and the sensor mechanism 4 is effective.

The test-lifting construction unit 112 is performed by estimating an approximate weight load value of each of the lifting points according to an architecture and component diagram of the bridge 5, so that a lifting force of each of the lifting points may be adjusted. To avoid any calculation error and assure the engineering safety, an initial lifting force has to be slightly smaller than the calculated approximate weight load value. When each of the lifting points is finished with the adjustment, the lifting force for each of the lifting points is increased in a fixed step variance. Whenever a position shift is produced, a test-lifting result is recorded. In the course of the operation of this unit 112, the real weight load value is served as a pressure reference value of the jacks 3 being in the course of lifting. The test-lifting construction raises the jacks 3 at a designated weight load to control the weight load, and a detachment process must be conducted until the weight load is maintained stable.

The lifting construction unit 113 is used to raise the bridge 5 by the jacks 3 in a successive manner, and further determine if there is any variant position shift produced with the girders of the bridge 5 according to the acquired data from the position variance sensor 41. If the variant position shift falls within a controllable range, the jacks 3 are increased with its rushing course continuously. After the upper structure of the bridge 5 raises synchronously to a designated shift, a spacer block is temporally supported at a lifting space. However, the lifting monitoring module 12, the sensor 41, the inclination sensor 42, the strain sensor 43 and the pressure sensor 44, in the course of lifting, provide detection signals as a reference for compensation or stop. Since the lifting for the bridge 5 is in a form of multiple-point lifting, the lifting course has to be coordinated; otherwise the lifting result may have an inclination or a void lifting phenomenon.

The pressure maintenance construction unit 114 maintains a temporally raised state after the lifting course for a subsequent construction. Its main task is to maintain the fixed raised position after the lifting course is finished. And, the pressure maintenance is performed mainly by a self-lock mechanism of a hydraulic system, so that the raised position maintains fixed. Once the lifting error is detected as having gone beyond a permitted range, a dynamic source is activated immediately and a lifting program is used at this time, so that the raised position may be raised to its original position by finely tuning the bridge 5 to reduce the variant position shift by the jacks 3. That is, a lifting displacement is a produced correction amount for the error.

The bridge lowering construction unit 115 is an engineering lowering the bridge 5 or a large scale structure associated back to a lowest position after the lifting and subsequent construction. This process has to be taken care with its variant position shift control to avoid any impair to the bridge body owing to any variant deformity and local collision.

As such, the above description may enable persons skilled in the art to implement the present invention to raise the upper structure of the bridge for the cases of bridge damage and land subsidence caused from such as typhoon, flood damage, earthquake, increased flood prevention elevation standard, replacement of the bridge bearing spacer block, adjustment of the old bridge elevation owing to the transportation requirements, etc.

The bridge 5 lifting may not only avoid concrete waste torn down from the original bridge and realize the ecological protection purpose, but also secure the advantages of relatively shorter engineering time and lower cost.

The synchronous bridge lifting system set forth in the present invention effectively avoid a secondary impair to the structure body of the bridge 5 resulting from the lifting construction to reduce the additional strain from the variant position shift in the course of lifting. Under some live experiments, the synchronous bridge lifting system may satisfy with the accurate control requirements, so that the present invention has the following advantages in operation: (1) having an on-line monitoring function, i.e. capable of on-line acquiring signal display, collection and data analysis, (2) having a fully automatic program monitoring function, and capable of performing construction control and safety alarm, and (3) capable of achieving an accurate control of the synchronous control of the overall lifting course by using the integrated close circuit feedback control along with the use of the bridge lifting engineering policy.

In view of the above, the synchronous control integrated system for bridge lifting of the present invention may effectively improve the demerits existing in the prior art, and has the characteristics where a shift variance generated by girders of a bridge may form a signal by using a sensor mechanism and jacks together transmitted on line to a monitor mechanism as a control parameter, so that the monitor mechanism may have an accurate adjustment and monitoring on an oil pressure control mechanism and the jacks, whereby completing the synchronous control operation for the bridge lifting course. Furthermore, the bridge lifting construction may have its improved accuracy and safety.

Therefore, the present invention can be deemed as more practical, improved and necessary to users, compared with the prior art.

The above described is merely examples and preferred embodiments of the present invention, and not exemplified to intend to limit the present invention. Any modifications and changes without departing from the scope of the spirit of the present invention are deemed as within the scope of the present invention. The scope of the present invention is to be interpreted with the scope as defined in the appended claims.

What is claimed is:

1. A synchronous control integrated system for lifting a bridge, comprising:
   a monitor mechanism;
   an oil pressure mechanism, connected to the monitor mechanism;
   a plurality of jacks, each connected to the oil pressure mechanism, respectively; and
   a sensor mechanism, connected to the monitor mechanism,
   wherein the monitor mechanism comprises a lifting policy module and a lifting monitor module for receiving a sensor signal generated from the sensor mechanism, and
   wherein the lifting policy module comprises a pre-lifting construction unit, a test-lifting construction unit, a lifting construction unit, a pressure maintenance construction unit and a bridge lowering construction unit.

2. The synchronous control integrated system for lifting the bridge as claimed in claim 1, wherein the sensor mechanism comprises a position variance sensor, an inclination sensor, a strain sensor, and a pressure sensor.

3. A synchronous control integrated system for lifting a bridge, comprising:
   a monitor mechanism,
   an oil pressure mechanism, connected to the monitor mechanism;
   a plurality of jacks, each connected to the oil pressure mechanism, respectively; and
   a sensor mechanism, connected to the monitor mechanism,
   wherein the sensor mechanism comprises a position variance sensor, an inclination sensor, a strain sensor, and a pressure sensor.

* * * * *